(12) United States Patent
Artz, Jr. et al.

(10) Patent No.: US 7,461,120 B1
(45) Date of Patent: Dec. 2, 2008

(54) METHOD AND SYSTEM FOR IDENTIFYING A VISITOR AT A WEBSITE SERVER BY REQUESTING ADDITIONAL CHARACTERISTIC OF A VISITOR COMPUTER FROM A VISITOR SERVER

(75) Inventors: John C. Artz, Jr., Newton, MA (US); William Bender, Norwich, VT (US); Heeren Pathak, Woburn, MA (US)

(73) Assignee: Vignette Corporation, Austin, TX (US)

( * ) Notice: Subject to any disclaimer, the term of this patent is extended or adjusted under 35 U.S.C. 154(b) by 1000 days.

(21) Appl. No.: 10/616,408

(22) Filed: Jul. 9, 2003

Related U.S. Application Data

(60) Provisional application No. 60/394,478, filed on Jul. 9, 2002.

(51) Int. Cl.
G06F 15/16 (2006.01)
(52) U.S. Cl. .................. 709/203; 709/219; 709/223; 709/229; 707/10
(58) Field of Classification Search .......... 709/203, 709/217, 219, 223, 227, 229, 246; 707/10
See application file for complete search history.

(56) References Cited

U.S. PATENT DOCUMENTS

| | | | |
|---|---|---|---|
| 5,557,717 | A | 9/1996 | Wayner |
| 5,732,218 | A | 3/1998 | Bland et al. |
| 6,041,335 | A | 3/2000 | Merritt et al. |
| 6,112,186 | A | 8/2000 | Bergh et al. |
| 6,119,103 | A | 9/2000 | Basch et al. |
| 6,144,962 | A | 11/2000 | Weinberg et al. |
| 6,205,472 | B1 | 3/2001 | Gilmour |
| 6,321,206 | B1 | 11/2001 | Honarvar |
| 6,430,539 | B1 | 8/2002 | Lazarus et al. |
| 6,456,305 | B1 | 9/2002 | Qureshi et al. |
| 6,496,824 | B1 * | 12/2002 | Wilf .................. 707/10 |
| 6,509,898 | B2 | 1/2003 | Chi et al. |
| 6,559,882 | B1 | 5/2003 | Kerchner |
| 6,606,657 | B1 | 8/2003 | Zilberstein et al. |
| 6,629,136 | B1 | 9/2003 | Naidoo |
| 6,640,215 | B1 | 10/2003 | Galperin et al. |
| 6,732,331 | B1 | 5/2004 | Alexander |

(Continued)

OTHER PUBLICATIONS

XSL Transformations (XSLT) Version 1.0, W3C Recommendation, www.w3.org/TR/1999/REC-xslt-19991116, pp. 1-87.

(Continued)

*Primary Examiner*—Oanh Duong
(74) *Attorney, Agent, or Firm*—Sprinkle IP Law Group

(57) ABSTRACT

A method and system can be used to identify visitors at a network site (e.g., a website) by using a combination of an address (e.g., IP address) and characteristic(s) of an individual visitor computer. Examples of the characteristic of the individual visitor computer can include the type of the computer, CPU identifier, OS, browser application and version, compatibility of the browser application with other browser applications, display size, screen resolution, locale information, installed plug-in software component(s), mimetypes supported, whether a programming language is enabled, accessory(ies) that can be activated by a browser application, or any other information that may be used in locating or generating a page. The method and system is more accurate than just using an IP address, and the information used for visitor identification will not usually be blocked if cookies are unavailable.

21 Claims, 4 Drawing Sheets

U.S. PATENT DOCUMENTS

| | | | |
|---|---|---|---|
| 6,757,740 | B1 | 6/2004 | Parekh et al. |
| 6,785,769 | B1 * | 8/2004 | Jacobs et al. ............... 711/118 |
| 6,839,682 | B1 | 1/2005 | Blume et al. |
| 6,966,034 | B2 * | 11/2005 | Narin ......................... 715/744 |
| 6,968,385 | B1 * | 11/2005 | Gilbert ....................... 709/229 |
| 7,032,017 | B2 * | 4/2006 | Chow et al. ................. 709/223 |
| 2001/0037321 | A1 | 11/2001 | Fishman et al. |
| 2002/0062223 | A1 * | 5/2002 | Waugh .......................... 705/1 |
| 2002/0091755 | A1 * | 7/2002 | Narin .......................... 709/203 |
| 2002/0112082 | A1 * | 8/2002 | Ko et al. ..................... 709/246 |
| 2002/0178169 | A1 * | 11/2002 | Nair et al. ................... 707/100 |
| 2003/0088716 | A1 * | 5/2003 | Sanders ....................... 709/330 |
| 2003/0212594 | A1 * | 11/2003 | Hogan .......................... 705/14 |
| 2003/0236892 | A1 * | 12/2003 | Coulombe ................... 709/228 |
| 2004/0205489 | A1 * | 10/2004 | Bogat ........................ 715/501.1 |

OTHER PUBLICATIONS

Cabena, Peter et al., Intelligent Miner for Data Applications Guide, IBM RedBook SG24-5252-00, Mar. 1999.

Datasage.com News and Events—DataSage Releases netCustomer, the 1st Individualization Solution for E-Commerce, retrieved Feb. 16, 2005 from Archive.org , 3 pgs, Aug. 2, 1999.

Datasage.com—Executive Overview—Retail, Retail Data Mining Executive Overview, retrieved Feb. 16, 2005 from Archive.org, 7 pgs, Dec. 1998.

Gallant, Steve et al., Successful Customer Relationship Management in Financial Applications (Tutorial PM-1), Conference on Knowledge Discovery in Data, ISBN:1-58113-305-7, pp. 165-241, 2000.

Vignette Corporation to Acquire DataSage, Inc., retrieved from Archive.org Feb. 16, 2005, 3 pgs, Jan. 10, 2000.

Chapman, Pete et al., CRISP-DM 1.0—Step-by-step data mining guide, retrieved from www.crisp-dm.org Feb. 17, 2005, pp. 1-78, 2000.

"Mozilla User-Agent String Specification" obtained from website <http:www.mozilla.org/build/revised-user-agent-strings.html>, pp. 1-5, Aug. 23, 2007.

* cited by examiner

METHOD AND SYSTEM FOR IDENTIFYING A VISITOR AT A WEBSITE SERVER BY REQUESTING ADDITIONAL CHARACTERISTIC OF A VISITOR COMPUTER FROM A VISITOR SERVER

RELATED APPLICATIONS

This application claims priority under 35 U.S.C. § 119(e) to U.S. Patent Application No. 60/394,478, entitled "System and Method for Site Visitor Identification" by Artz et al., filed on Jul. 9, 2002. This application is related to U.S. patent application Ser. Nos. 10/616,107, entitled "System and Method of Associating Events with Requests" by Pathak et al., filed on Jul. 9, 2003, and 10/616,136, entitled "System and Method for Detecting Gaps in a Data Stream" by Artz et al., filed on Jul. 9, 2003. All applications listed in this paragraph are assigned to the current assignee hereof and are incorporated herein by reference.

FIELD OF THE INVENTION

This invention relates in general to the operation of a network site, and more particularly, to identification of visitors to the network site.

DESCRIPTION OF THE RELATED ART

The number of visitors visiting a web site (i.e., "visitor identification") is an important metric for most commercial sites. Investors use the metric to gauge the value of a site, advertisers use the metric to determine what is a reasonable amount of money to pay for ads on the site, businesses use the metric to determine their own internal return of investment for their site. Therefore, the ability to capture more accurately visitor counts can be a real competitive advantage.

Many systems (e.g., WebTrends) use only the Internet Protocol ("IP") address and end up counting multiple individual users from the same IP address as a single user. This technique of using IP addresses worked during the early days of the Internet when computers connected to the Internet typically had hardwired IP addresses and the use of Network Address Translation (NAT) gateways was minimal. As the number of IP address started running out and security concerns increased, the use of NAT gateways and dynamic IP addresses have become commonplace.

Another method of identifying visitors is through the use of cookies. A web browser on the visitor computer may be set to not allow cookies or a visitor may not want to provide information to used to generate the cookies. Therefore, a method or system that depends on cookies may be unavailable.

SUMMARY OF THE INVENTION

A method and system can be used to identify visitors at a network site (e.g., a website) by using a combination of an address and characteristic(s) of an individual visitor computer. An example of an address can be a network address, an IP address, or the like. Examples of the characteristic of the individual visitor computer can include the type of the computer, Central Processing Unit ("CPU") identifier, operating system ("OS"), browser application and version, compatibility of the browser application with other browser applications, display size, screen resolution, locale information, installed plug-in software component(s), mimetypes supported, whether a programming language (e.g., Java) is enabled, accessories that can be activated by a browser application, or any other information that may be used in locating or generating a page for the individual visitor computer requesting the information, whether or not such information is actually used by a website server computer. The method and system is more accurate than just using an IP address, and the information used for visitor identification will not usually be blocked if cookies are unavailable.

The method and system improves the ability to identify a visitor only by using the information a website server computer regularly receives in receiving and responding to requests. From the perspective outside the website, the method and system are transparent. From the visitor's perspective, he or she does not need to complete a form or send any additional information. From the network (e.g., Internet) perspective, the load on the network does not change by using the method and system. The characteristics are routinely transmitted and may be used by a network computer in locating or generating a page corresponding to a request from the visitor computer. In an alternative embodiment, a website server computer may request more characteristics of an individual visiting computer from which the request originates, but such requests do not significantly increase traffic on network.

In one set of embodiments, a method of identifying a visitor at a network site can comprise receiving an address from a first visitor computer and a first characteristic of a second visitor computer. The method can also comprise generating a first visitor identifier using the address and the first characteristic.

In another set of embodiments, a data processing system readable medium comprising code embodied in a data processing system readable medium. The code can comprise an instruction for accessing an address from a first visitor computer and a first characteristic of a second visitor computer. The code can also comprise an instruction for generating a first visitor identifier using the address and the first characteristic.

In a further set of embodiments, a system for identifying a visitor at a network site can comprise individual visitor computers, a network site computer, and a visitor control computer. The visitor control computer can be bidirectionally coupled to the individual visitor computers and the network site computer. The visitor control computer may be configured to not provide an address of any individual visitor computer to the network site computer. The network site computer may be configured to generate a visitor identifier from an address received from the visitor control computer and a characteristic of at one of the individual visitor computers.

The foregoing general description and the following detailed description are exemplary and explanatory only and are not restrictive of the invention, as defined in the appended claims.

BRIEF DESCRIPTION OF THE DRAWINGS

The present invention is illustrated by way of example and not limitation in the accompanying figures.

Figure 1:
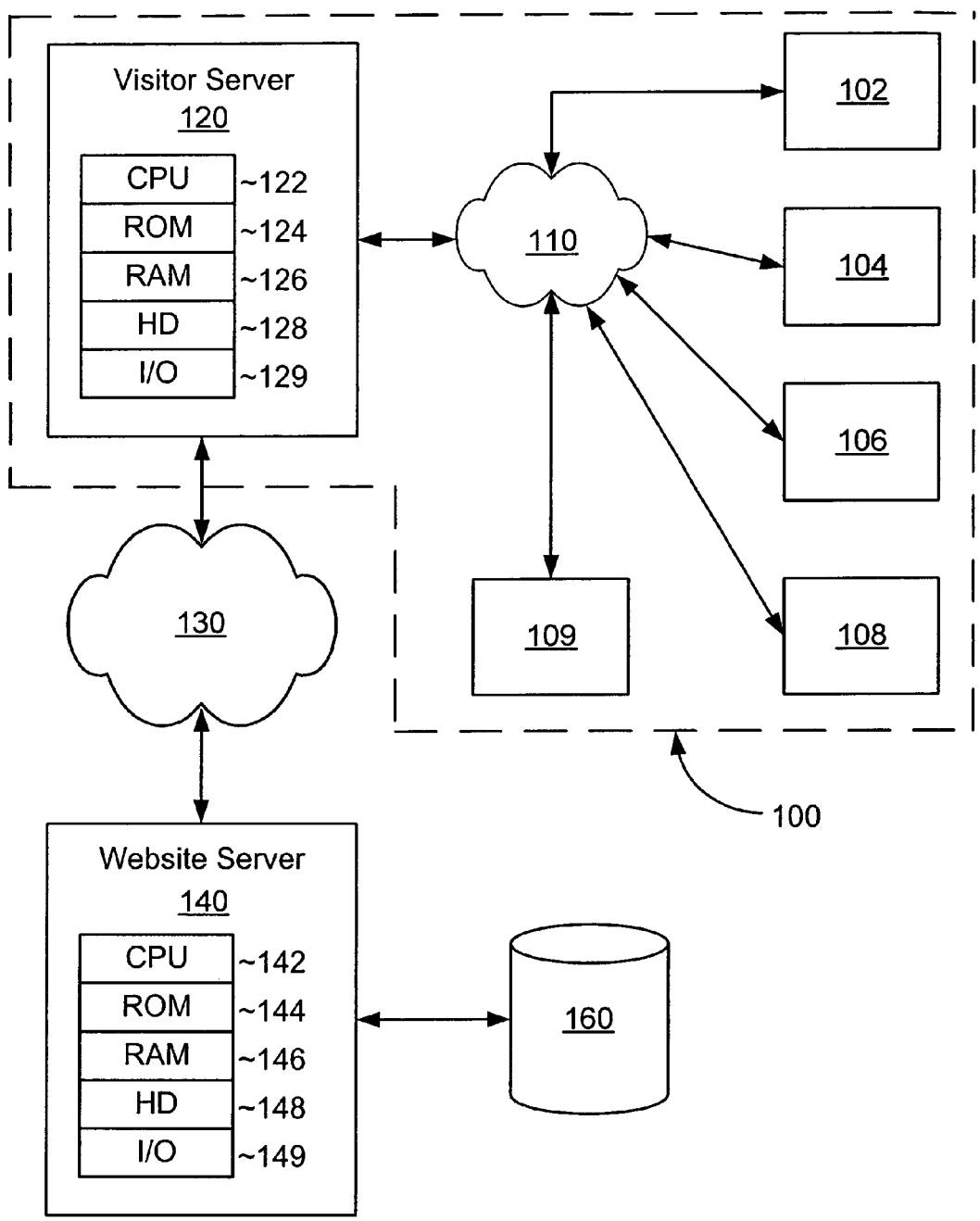
FIG. 1 includes an illustration of a network system including internally networked computers coupled to an external network server computer via an external network, wherein the system includes a software component with code having instructions in accordance with an embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Reference is now made in detail to the exemplary embodiments of the invention, examples of which are illustrated in the accompanying drawings. Wherever possible, the same reference numbers will be used throughout the drawings to refer to the same or like parts (elements).

A method and system can be used to identify visitors at a network site (e.g., a website) by using a combination of an address and characteristic(s) of an individual visitor computer. An example of an address can be a network address, an IP address, or the like. Examples of the characteristic of the individual visitor computer can include the type of the computer, CPU identifier, OS, browser application and version, compatibility of the browser application with other browser applications, display size, screen resolution, locale information, installed plug-ins, mimetypes supported, whether a programming language (e.g., Java) is enabled, accessories that can be activated by a browser application, or any other information that may be used in locating or generating a page for the individual visitor computer requesting the information, whether or not such information is actually used by a website server computer. The method and system is more accurate than just using an IP address, and the information used for visitor identification will not usually be blocked if cookies are unavailable.

The method and system improves the ability to identify a visitor only by using the information a website server computer regularly receives in receiving and responding to requests. From the perspective outside the website, the method and system are transparent. From the visitor's perspective, he or she does not need to complete a form or send any additional information. From the network (e.g., Internet) perspective, the load on the network does not need to change by using the method and system. The characteristics are routinely transmitted and may be used by a network computer in locating or generating a page corresponding to a request from the visitor computer. In an alternative embodiment, a website server computer may request more characteristics of an individual visiting computer from which the request originates, but such requests do not significantly increase traffic on network.

A few terms are defined or clarified to aid in understanding the descriptions that follow. A network includes an interconnected set of server and client computers over a publicly available medium (e.g., the Internet) or over an internal (company-owned) system. A user at a client computer may gain access to the network using a network access provider. An Internet Service Provider ("ISP") is a common type of network access provider.

The term "session" is intended to mean a period over which request(s) from a single user that is (are) typically associated with a task at a network site, such as obtaining information, ordering products, etc. A session begins when the single user makes an initial request and ends when the single user leaves the network site or when inactivity from such single user at the network site exceeds a predetermined time period (e.g., 10 minutes, an hour, etc.).

The term "software component" is intended to mean at least a portion of a computer program (i.e., a software application). Examples include a visitor identifier generator software component, a plug-in software component, or the like. Different software components may reside in the same computer program or in different computer programs on the same computer or different computers.

As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited to only those elements but may include other elements not expressly listed or inherent to such method, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Attention is now directed to an exemplary hardware configuration as shown in FIG. 1 that may be used in accordance with an embodiment of the present convention. Referring to FIG. 1, a plurality of individual visitor computers 102, 104, 106, 108, and 109 that may be bidirectionally coupled to visitor server computer 120 via internal network 110. Individual visitor computers 102, 104, 106, 108, or 109 may be client computers or connected in a peer-to-peer configuration. Individual visitor computers 102, 104, 106, 108, or 109 and visitor server computer 120 may lie within firewall 100. Visitor server computer 120 may be bidirectionally coupled to website server computer 140 via external network 130, such as the Internet. Therefore, from the perspective of website server computer 140, everything within firewall 100 may be viewed as "visitors." Website server computer 140 may be bidirectionally coupled to a database 160. The website server computer 140 is an example of a network computer. Additionally, visitor server computer 120 may act as a visitor control computer as it can act as a gateway and a security checkpoint for individual visitor computers 102, 104, 106, 108, and 109 within firewall 100.

Visitor server computer 120 can include a central processing unit ("CPU") 122, a read-only memory ("ROM") 124, a random access memory ("RAM") 126, a hard drive ("HD") or storage memory 128, and input/output device(s) ("I/O") 129. I/O 129 can include a keyboard, monitor, printer, electronic pointing device (e.g., mouse, trackball, stylus, etc.), or the like. Website server computer 140 likewise has CPU 142, ROM 144, RAM 146, HD 148, and I/O 149.

Each of the individual visitor computers 102, 104, 106, 108, and 109 may have one or more of CPU, ROM, RAM, HD, and I/O. Examples of the individual visitor computers include a personal computer, a workstation, a personal digital assistant ("PDA"), a cellular phone, a pager, and the like. More or fewer individual visitor computers may be coupled to visitor server computer 120.

Each of the computers 102, 104, 106, 108, 109, 120, and 140 is an example of a data processing system. ROM, RAM, HD, and databases can include media that can be read by the CPU of a computer. Therefore, each of these types of memories includes a data processing system readable medium. These memories may be internal or external to the computers.

The methods described herein may be implemented in suitable software code that may reside within ROM, RAM, or HD. The instructions in an embodiment of the present invention may be contained on a data storage device, such as HD 148. A software component for carrying out the methods described herein can comprise a combination of software code elements that are embodied within a data processing system readable medium on HD 148. Alternatively, the instructions may be stored as software code elements on a DASD array, magnetic tape, floppy diskette, optical storage device, or other appropriate data processing system readable medium or storage device.

Figure 2:
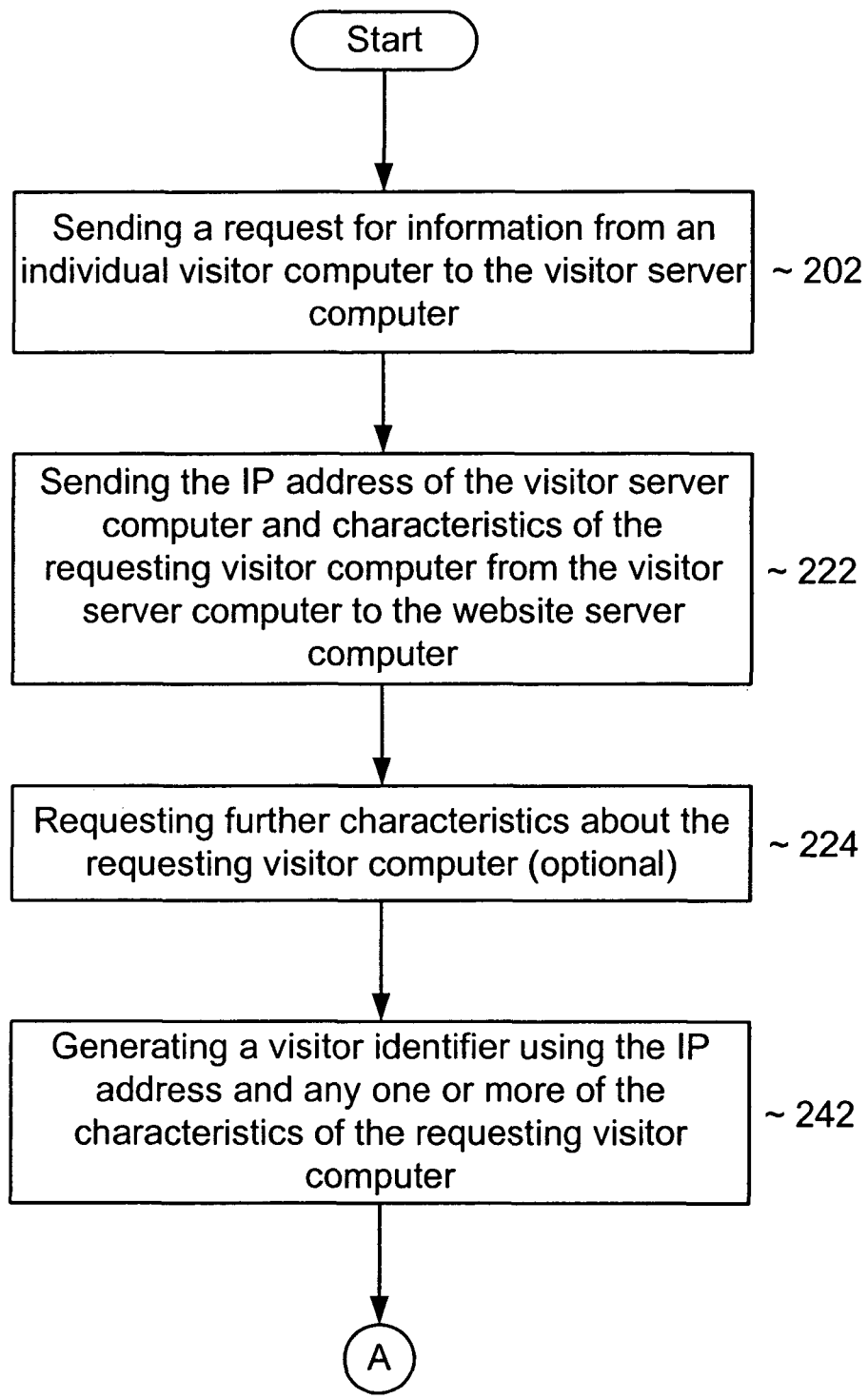
FIGS. 2-3 includes a process flow diagram for identifying a visitor in accordance with an embodiment of the present invention.
Figure 3:
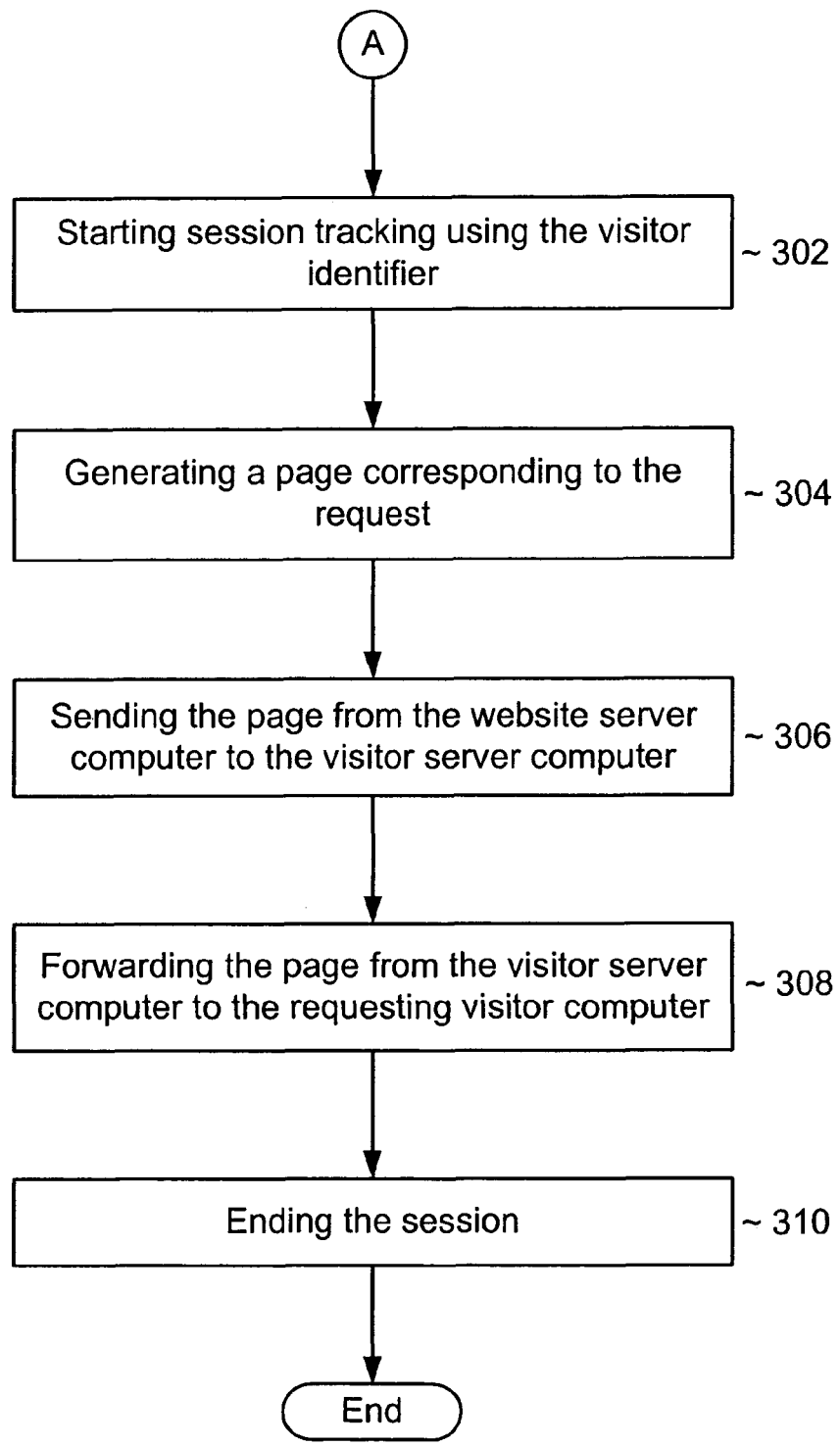

In an illustrative embodiment of the invention, the computer-executable instructions may be lines of assembly code, compiled C++, Java, or other language code. The functions of any one of the computers may be performed by a different computer. Additionally, a computer program or its software components with such code may be embodied in more than one data processing system readable media in more than one computer. FIGS. 2-3 includes an illustration, in the form of a flowchart, of the structures and operations of such software program(s).

Communications between any of the computers can be accomplished using electronic, optical, radio-frequency, or other signals. For example, when a user is at individual visitor computer 102, 104, 106, 108, or 109, such individual visitor computer may convert the signals to a human understandable form when sending a communication to the user and may convert input from a human to appropriate electronic, optical, radio-frequency, or other signals to be used by that computer or other computers. Likewise, when an operator is at website server computer 140, website server computer 140 may convert the signals to a human understandable form when sending a communication to the operator and may convert input from a human to appropriate electronic, optical, radio-frequency, or other signals to be used by that computer or other computers.

Before turning to the details of the method, more details regarding the individual visitor computers is given. Note that individual visitor computers 102, 104, 106, 108, and 109 may be similar or different compared to one another. The similarities or differences may be related to differences in types of the computers (personal computer, a workstation, a PDA, a cellular phone, a pager, etc.), CPU identifier (Intel x486™ class, Pentium 3™ class, Power PC 3™ class, etc.) OSs (Windows 200™, Linux, MacOS X™ (etc.), browser applications and versions (Netscape 7.0™, Internet Explorer 6.0™, Apple Safari™, Opera 7.1™, etc.), display size (display for personal computer, PDA, cellular phone, pager, etc.), screen resolution (800×600 pixels, 1024×768 pixels), locale information (language, geographic region, time zone, etc.), installed plug-in software components mimetypes supported, whether a programming language (e.g., Java) is enabled, accessories that can be activated by a browser application, or any other information that may be transmitted by the visitor server computer 120 in providing information to the website server computer 140 in order to locate or generate a page for the individual visitor computer requesting the information.

With all this information available, the likelihood of properly distinguishing between individual visitor computers increases as the number of characteristics is considered. For example, individual visitor computer 102 may be a personal computer using a Windows 2000™ OS, Internet Explorer 6.0™ browser, have locale information corresponding to the U.S., and have a screen resolution of 800×600 pixels. Individual visitor computer 104 may be similar to individual visitor computer 102 except that Netscape 7.1™ browser and a screen resolution of 1024×768 pixels is used. Individual computer 106 may be similar to individual visitor computer 104 except that MacOS X™ OS and Apple Safari™ browser may be used. Individual computer 108 may be similar to individual visitor computer 104 except that Opera 7.1™ browser may be used. Individual computer 109 may be similar to individual visitor computer 104 except that it has a unique set of plug-in software components activated. As can be seen, each of the individual visitor computers has at least one different characteristic of the browsing environment as compared to the other individual visitor computers.

Attention is now directed to an exemplary method for using the system in order for website server computer 140 to identify more accurately an individual visitor. FIGS. 2-3 include one non-limiting, exemplary method of using the system in accordance with an embodiment of the present invention. After reading this specification, skilled artisans will appreciate that many other embodiments may be used.

Referring to FIG. 2, the exemplary method can comprise sending a request for information from individual visitor computer 102, 104, 106, 108, or 109 ("requesting visitor computer") to visitor server computer 120 (block 202 in FIG. 2), sending an IP address of visitor server computer 120 and characteristics of the requesting visitor computer from visitor server computer 120 to website server computer 140 (block 222), requesting further characteristics about the requesting visitor computer (optional) (block 224), and generating a visitor identifier using the IP address and any one or more of the characteristics of the requesting visitor computer (block 242). Referring to FIG. 3, the exemplary method can continue with starting session tracking using the visitor identifier (block 302), generating a page corresponding to the request (block 304), sending the page from website server computer 140 to visitor server computer 120 (block 306), forwarding the page from visitor server computer 120 to the requesting visitor computer (block 308), and ending the session (block 310).

The method will be explained in more detailed below to give a better understanding of the invention and some alternatives. Referring to FIG. 2, the method can comprise sending a request for information from the requesting visitor computer (e.g., individual visitor computer 102, 104, 106, 108, or 109) to visitor server computer 120. The request can include a Uniform Resource Locator ("URL"), an address or other identifier for requesting visitor computer that is recognized by visitor server computer 120, and one or more characteristics of the requesting visitor computer.

The characteristics may be within a header portion of a request in the Hypertext Transfer Protocol ("HTTP"). In one embodiment, the user-agent information in the user-agent string of the requesting visitor computer may be used as the characteristic. A user-agent string specification has been published by The Mozilla Organization and can be found at the Mozilla website. The Mozilla user-agent string specification is incorporated herein by reference. The user-agent information can include the browser application and version and compatibility information regarding the browser application. For example, the user-agent information may include Internet Explorer 6.0™ browser that is also compatible with an Internet Explorer 5.x™ browser or Internet Explorer 4.x™ browser. In another example, the user-agent information may include Opera 7.1™ browser that is also compatible with an Internet Explorer 6.x™, Internet Explorer 5.x™, Netscape 6.x™ or Netscape 4.7™ browser.

Additional user-agent information may include the type of computer, OS, CPU identifier, locale information, a display size, or a resolution setting, or the like. In addition to the user-agent information, other information in the header of the request may be used.

Note that the content within the user-agent string may vary depending on the browser and configuration of the requesting visitor computer. Therefore, some of the attributes previously listed as potentially being within the user-agent string (e.g., OS, locale information) may not be within the user-agent string but may still be present elsewhere within the header portion of the request. Such information may include mime-types supported, installed plug-in software components, accessories that can be activated by a browser application, or whether a specific programming language (e.g., Java) is enabled.

Note that the information regarding the requesting visitor computer may be needed or useful to website server computer 140 in locating or generating a page for the requesting visitor computer. Note that the information does not have to be used by website server computer 140; it may be provided in the ordinary course of sending requests from the requesting visitor computer.

The method can further comprise sending an IP address of visitor server computer 120 and characteristics of the requesting visitor computer from visitor server computer 120 to website server computer 160 (block 222). The actual address of requesting visitor computer may not be transmitted through the firewall 100. Visitor server computer 120 may mask the actual address of requesting visitor computer. Visitor server computer 120 may use its IP address for all requests going outside firewall 100 or may assign one IP address from a set of IP addresses. However, characteristics of the requesting visitor computer may be needed or at least be helpful in locating or generating a page by website server computer 160. Therefore, the characteristics of the requesting visitor computer can be sent from visitor server computer 120 and received by website server computer 140 via external network 130.

Optionally, website server computer 140 may request additional information regarding the characteristics about the requesting visitor computer beyond the information in the request from the visitor server computer. The request from website server computer 140 may be sent via external network to visitor server computer 120. An example of the characteristic of the requesting visitor computer may include a CPU identifier for the CPU used by the requesting visitor computer if it was not provided with the request from visitor server computer 120. Other characteristics may include other hardware or firmware configurations of the requesting visitor computer. The ability to identify more accurately requesting visitor computers generally increases as more characteristics are used by website server computer 140.

Website server computer 140 can generate a visitor identifier using the IP address and any one or more of the characteristics of the requesting visitor computer (block 242). Note that the IP address will be the IP address as provided by visitor server computer 140, rather than the actual address of the requesting visitor computer. Website server computer 140 can take the header portion from the request and parse it to determine the characteristics of the requesting visitor information. Note that some of the information for the characteristics may not be transmitted within the header portion of the request and may be obtained by website server computer 140 requesting additional information regarding the requesting visitor computer as previously described.

At website server computer 140, a visitor identifier generator software component within HD 148 may be loaded into RAM 146 and be executed by CPU 142. CPU 142 may be able to take the inputs from the IP address and any one or more of the characteristics of the requesting visitor computer and execute the instructions of the visitor identifier generator software component to generate a visitor identifier. The visitor identifier may be a composite key of nearly any length in size and can include nearly any type of character (alphabetic, numerical, punctuation or other ASCII characters, or combinations thereof). In one implementation, the composite key corresponding to the visitor identifier may be generated using concatenation of the information, a hashing function, combination thereof, or the like. The actual implementation selected is not critical and can vary based upon the desires of the operator of website server computer 140. After a visitor identifier is generated, the visitor identifier may be cached within RAM 146, stored onto HD 148, or transmitted to database 160.

Many different subsequent actions may be taken at this point in the method. The following is one of many different applications for using the visitor identifier. For example the visitor identifier may be compared to existing visitor identifiers within database 160 to determine if the same visitor identifier has been used at website server computer 140.

The method can further comprise starting session tracking using the visitor identifier (block 302 in FIG. 3). A web log may be used to keep track of the pages that the visitor requests during the same session. After receiving the request, the method can further comprise generating a page corresponding to the request (block 304). Web server computer 140 can generate and customize the page for the requesting visitor computer by using the characteristics that originated from the requesting visitor computer.

The method can still further comprise sending the page from website server computer 140 to visitor server computer 120 (block 306). After receiving the page from website server computer 140, visitor server computer 120 matches the page to the requesting visitor computer. The method can also comprise forwarding the page from visitor server computer 120 to the requesting visitor computer (block 308). The process of making additional requests from the same requesting visitor computer, whether the same or different, can be iterated any number of times during a single session. At the end of the session, the method can comprise ending the session (block 310).

Some advantages of the method and system are noted. Even if all requests from individual visitor computers 102, 104, 106, 108, and 109 are designated with the same IP address when their requests are sent from visitor server computer 120 to website server computer 140, the different characteristics of the individual visitor computers 102, 104, 106, 108, and 109 may be detected. Each individual visitor computer 102, 104, 106, 108, or 109 may have its own unique combination of an IP address and characteristics. Therefore, each of the individual visitor computers 102, 104, 106, 108, and 109 can have its own visitor identifier without the use of a cookie or the actual address for such individual visitor computer. The method can use information as simple as an IP address and user-agent information in the user-agent string. Alternatively, additional characteristics can be determined from the request, if present.

The information used for generating the visitor identifier can be the same information that is used to locate and generate pages in response to requests even if cookies or the actual address of individual visitor computer 102, 104, 106, 108, or 109 is used or available. Therefore, additional unnecessary information is not being collected by visitor server computer 120 or transmitted between visitor server computer 120 and website server computer 140. The amount of computer resources needed to generate and use the visitor identifier in nearly all embodiments should be insignificant.

Even if further a request for characteristics of the requesting visitor computer is made by website server computer 140, the added traffic is expected to be insignificant, as relatively small portions of ASCII or similar text may be transmitted, as opposed to a long text document (over 100 Kb long) or video or image files that are also transmitted over network 110 and 130.

Figure 4:
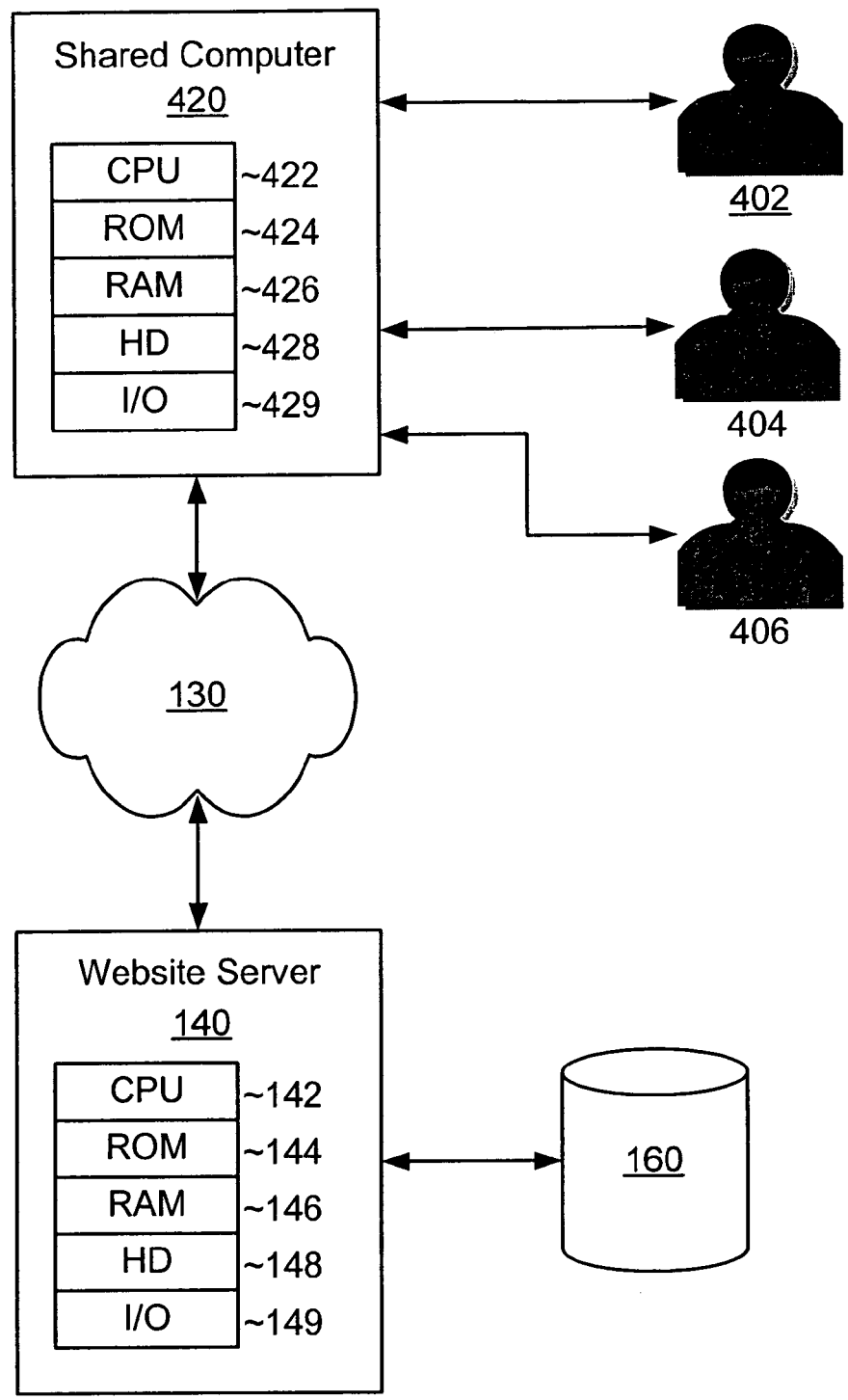
FIG. 4 includes an illustration of a network system including a shared computer coupled to an external server computer via an external network, wherein the system includes a software component with code having instructions in accordance with an embodiment of the present invention.

Another alternative hardware configuration can be seen in FIG. 4. FIG. 4 includes a shared computer 420 that may be used by a number of different users 402, 404, and 406. Shared computer 420 includes a CPU 422, ROM 424, RAM 426, HD 428, and I/O 429. Shared computer 420 may allow different individual accounts for the different users. In this configuration, the same computer, OS, browser application and version may be used. However, the different users may have different resolution settings, different configurations of plug-in software components activated, or other differences. Therefore, each individual user account may result in different characteristics for each of users 402, 404, and 406 even though they may use the same computer, OS, browser application and version. As long as at least one characteristic is different between users 402, 404, and 406, website server computer 140 can distinguish between the different users 402, 404, and 406. Note that from the perspective of website server computer 140, the type of information received by website server computer 140 over external network 130 in FIG. 4 may not appear any different from the type of information received from the configuration shown in FIG. 1.

In still another alternative embodiment, the method can also be implemented in a configuration where a single user at single computer (not shown) is coupled to the website server computer 140 via external network 130. Therefore, the method is flexible to handle a wide variety of configurations.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:

1. A method of identifying a visitor at a network site comprising:
    receiving, at a website server, a network address of a visitor server computer and a first characteristic of a requesting visitor computer from the visitor server computer over a first network, wherein the visitor server computer is communicatively coupled to the requesting visitor computer over a second network and wherein the first characteristic of the requesting visitor computer is obtained, by the visitor server computer, from a header portion of a request for information sent from the requesting visitor computer to the visitor server computer over the second network;
    determining, at the website server, if a second characteristic of the requesting visitor computer is needed from the visitor server computer;
    requesting, by the website server, additional information regarding the second characteristic of the requesting visitor computer, wherein said requesting additional information comprises sending, by the website server, a request for the second characteristic of the requesting visitor computer to the visitor server computer over the first network;
    receiving, at the website server, the additional information regarding the second characteristic of the requesting visitor computer from the visitor server computer over the first network, wherein the second characteristic is obtained, by the visitor server computer, from the header portion of the request sent from the requesting visitor computer to the visitor server computer over the second network; and
    generating, at the website server, a first visitor identifier using the network address provided by the visitor server computer, the first characteristic of the requesting visitor computer and the second characteristic of the requesting visitor computer.

2. The method of claim 1, wherein generating the first visitor identifier is performed using only the network address and information within a user-agent string of the request originating from the requesting visitor computer.

3. The method of claim 2, wherein the user-agent string includes a browser identifier for a browser application on the requesting visitor computer and compatibility information regarding the browser application.

4. The method of claim 1, wherein the first characteristic of the requesting visitor computer comprises a type of computer, a CPU identifier, an OS, a browser application, a version of a browser application, compatibility information regarding the browser application, locale information, an accessory that can be activated by the browser application, a display size, a resolution setting, or whether a programming language is enabled.

5. The method of claim 1, wherein the visitor server computer is communicatively coupled to a plurality of requesting visitor computers over the second network.

6. The method of claim 5, wherein the first characteristic is sent from the requesting visitor computer to the visitor server computer before the website server generating the first visitor identifier.

7. The method of claim 5, further comprising:
    receiving from the visitor server computer a second characteristic of a second requesting visitor computer, wherein the second requesting visitor computer is different from the visitor server computer and the requesting visitor computer; and
    generating a second visitor identifier using the network address of the visitor server computer and the second characteristic of the second requesting visitor computer.

8. The method of claim 1, wherein:
    the first characteristic is a first characteristic of a first browsing environment of the requesting visitor computer; and
    the method further comprises:
    receiving from the visitor server computer a second characteristic of a second browsing environment of the requesting visitor computer, wherein the first and second browsing environments use the same OS, browser application, and version of browser application; and
    generating a second visitor identifier using the network address provided by the visitor server computer and the second characteristic of the second browsing environment of the requesting visitor computer.

9. The method of claim 1, wherein generating the first visitor identifier is performed without the use of a cookie.

10. A data processing system readable storage medium storing computer-executable code for identifying a visitor at a network site, the code comprising:

an instruction for a website server to access a network address of a visitor server computer and a first characteristic of a requesting visitor computer from a visitor server computer over a first network, wherein the visitor server computer is communicatively coupled to the requesting visitor computer over a second network and wherein the first characteristic of the requesting visitor computer is obtained, by the visitor server computer, from a header portion of a request for information sent from the requesting visitor computer to the visitor server computer over the second network;

an instruction for the website server to determine if a second characteristic of the requesting visitor computer is needed from the visitor server computer;

an instruction for the website server to send a request for the second characteristic of the requesting visitor computer to the visitor server computer over the first network after receiving the network address provided by the visitor server computer and the first characteristic of the requesting visitor computer from the visitor server computer;

an instruction for the website server to access the second characteristic of the requesting visitor computer received from the visitor server computer, wherein the second characteristic was obtained, by the visitor server computer, from the header portion of the request sent from the requesting visitor computer to the visitor server computer over the second network; and an instruction for the web server to generate a first visitor identifier using the network address provided by the visitor server computer, the first characteristic of the requesting visitor computer and the second characteristic of the requesting visitor computer.

11. The data processing system readable storage medium of claim 10, wherein the code further comprises an instruction for the web server to generate the first visitor identifier using only the network address and information within a user-agent string of the request originating from the requesting visitor computer.

12. The data processing system readable storage medium of claim 11, wherein the user-agent string includes a browser identifier for a browser application on the requesting visitor computer and compatibility information regarding the browser application.

13. The data processing system readable storage medium of claim 10, wherein the first characteristic of the requesting visitor computer comprises a type of computer, a CPU identifier, an OS, a browser application, a version of a browser application, compatibility information regarding the browser application, locale information, an accessory that can be activated by the browser application, a display size, a resolution setting, or whether a programming language is enabled.

14. The data processing system readable storage medium of claim 10, wherein the visitor server computer is communicatively coupled to a plurality of requesting visitor computers over the second network.

15. The data processing system readable storage medium of claim 14, wherein the code further comprises:

an instruction for the web server to access a second characteristic of a second requesting visitor computer received from the visitor server computer, wherein the second requesting visitor computer is different from the visitor server computer and the requesting visitor computer; and an instruction for the web server to generate a second visitor identifier using the network address of the visitor server computer and the second characteristic of the second requesting visitor computer.

16. The data processing system readable storage medium of claim 10, wherein:

the first characteristic is a first characteristic of a first browsing environment of the requesting visitor computer; and wherein the code further comprises:

an instruction for the web server to access a second characteristic of a second browsing environment of the requesting visitor computer from the visitor server computer, wherein the first and second browsing environments use the same OS, browser application, and version of browser application; and an instruction for the web server to generate a second visitor identifier using the network address provided by the visitor server computer and the second characteristic of the second browsing environment of the requesting visitor computer.

17. The data processing system readable storage medium of claim 10, wherein neither the first characteristic nor the second characteristic of the requesting visitor computer is a cookie and wherein the first visitor identifier is generated without the use of a cookie.

18. A system for identifying a visitor at a network site comprising:

a plurality of requesting visitor computers;

a network site computer; and a visitor server computer bidirectionally coupled to the plurality of requesting visitor computers over a first network and to the network site computer over a second network, wherein:

the visitor server computer is configured to not provide an address of any of the requesting visitor computers to the network site computer; and the network site computer is configured to:

receive a network address of the visitor server computer and a characteristic of at least one of the plurality of requesting visitor computers from the visitor server computer over the second network, determining if one or more additional characteristics of the at least one of the plurality of requesting visitor computers is needed from the visitor server computer, request the visitor server computer to send the one or more additional characteristics of the at least one of the plurality of requesting visitor computers over the second network, receive, from the visitor server computer, the one or more additional characteristics of the at least one of the plurality of requesting visitor computers, wherein the characteristic and the one or more additional characteristics of the at least one of the plurality of requesting visitor computers are obtained, by the visitor server computer, from a header portion of a request sent from the at least one of the plurality of requesting visitor computers to the visitor server computer over the first network, and generate a visitor identifier from the network address of the visitor server computer, the characteristic and the one or more additional characteristics of the at least one of the plurality of requesting visitor computers.

19. The system of claim 18, wherein at least one of the plurality of requesting visitor computers is not configured to receive cookies.

20. The system of claim 18, wherein the visitor server computer regulates communications across a firewall, wherein each of the plurality of requesting visitor computers operates behind the firewall, and wherein the network site computer and any of the plurality of requesting visitor computers communicate to each other via the visitor server computer.

21. The system of claim 18, wherein the visitor server computer is configured to provide a characteristic of the at least one of the plurality of requesting visitor computers to the network site computer in response to receiving the request sent from the at least one of the plurality of requesting visitor computers to the visitor server computer.

* * * * *